Jan. 15, 1963   R. T. BEERS   3,073,192
SPLINED SOCKET MEMBER FOR WRENCHES
Original Filed Dec. 23, 1957   2 Sheets-Sheet 1
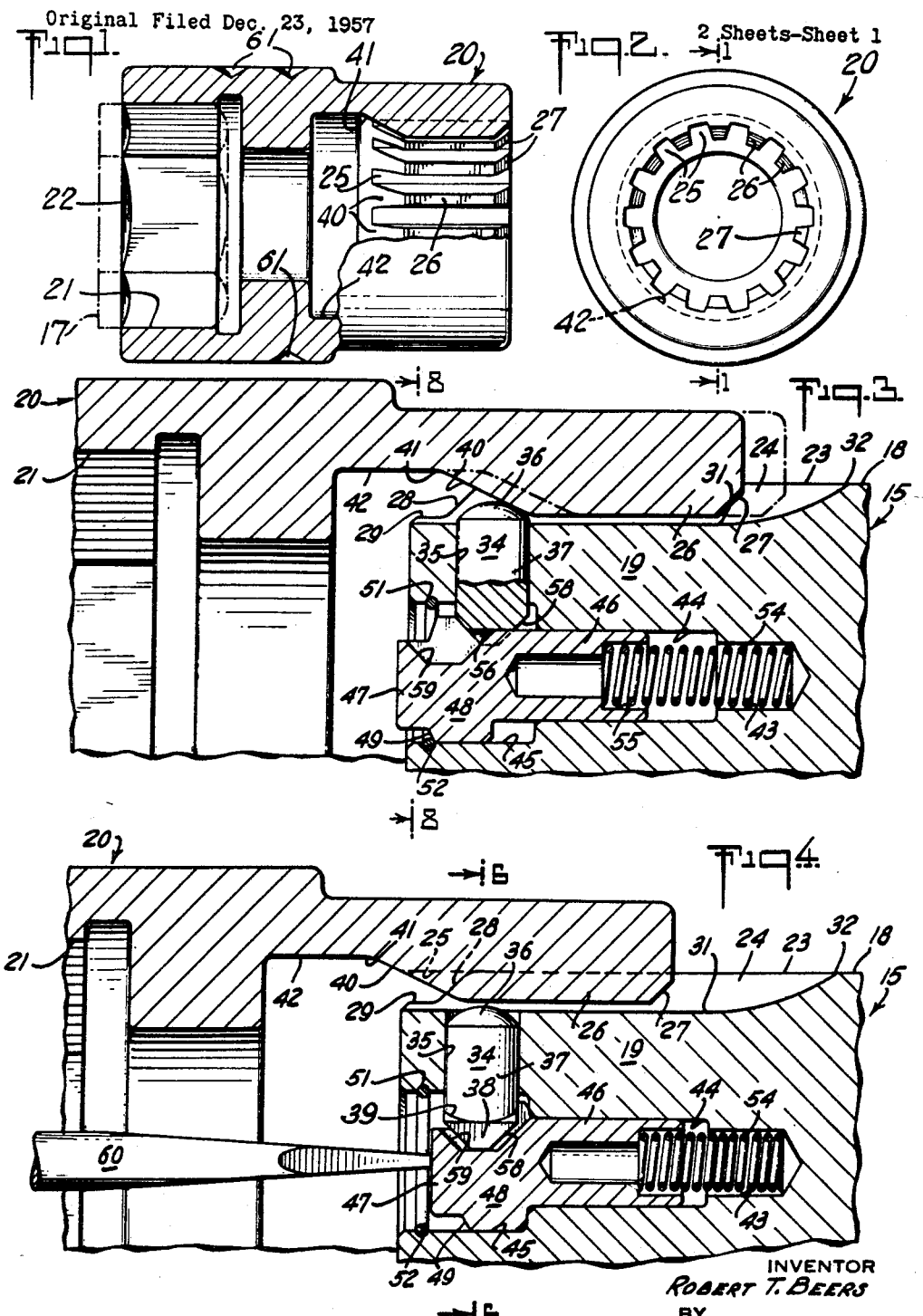

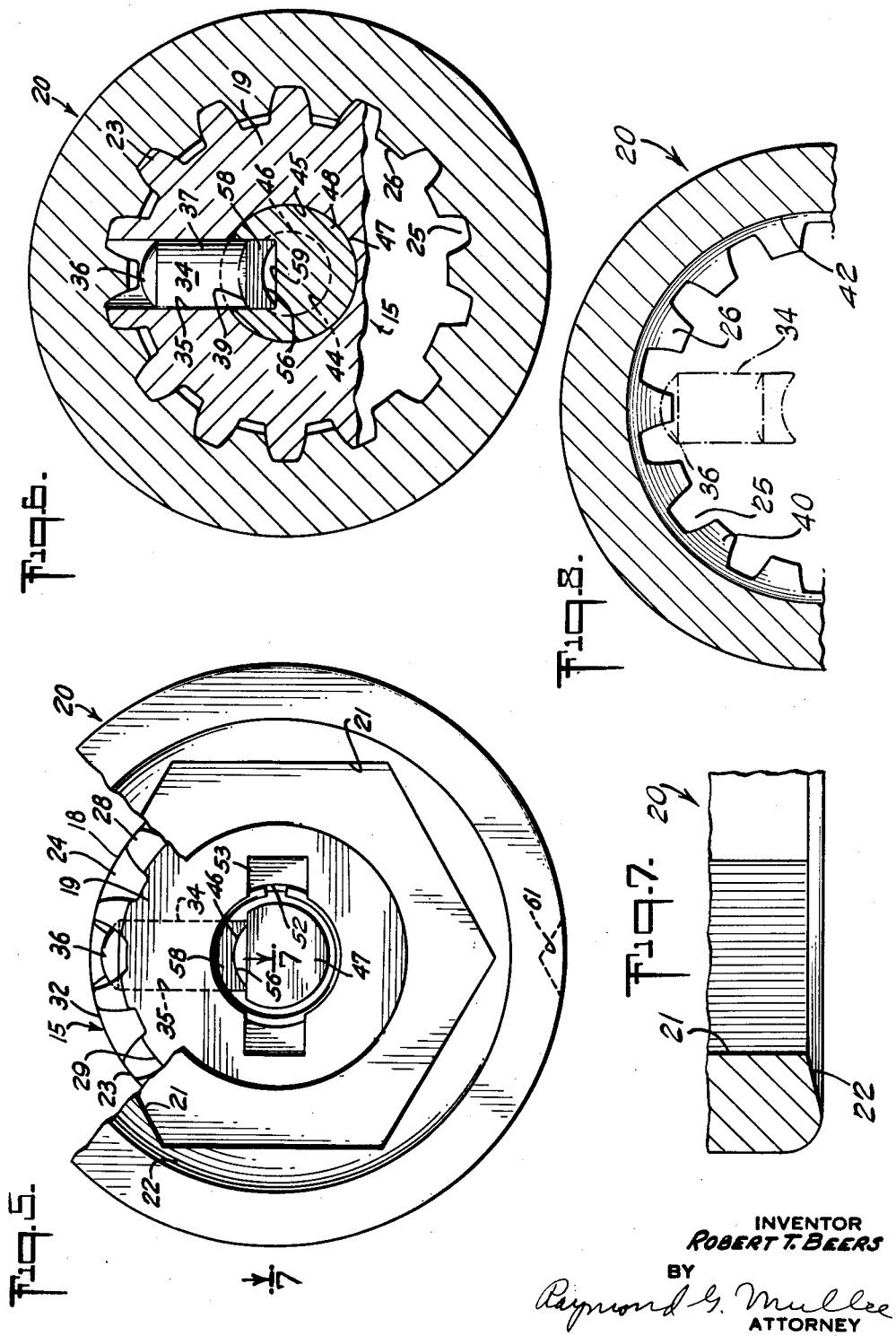

United States Patent Office 3,073,192
Patented Jan. 15, 1963

3,073,192
SPLINED SOCKET MEMBER FOR WRENCHES
Robert T. Beers, New York, N.Y., assignor to Chicago Pneumatic Tool Company, New York, N.Y., a corporation of New Jersey
Original application Dec. 23, 1957, Ser. No. 704,467, now Patent No. 2,954,994, dated Oct. 4, 1960. Divided and this application June 23, 1960, Ser. No. 38,192
10 Claims. (Cl. 81—121)

This invention relates to a wrench socket member having splines which are constructed and arranged to form part of a retaining means for locking the socket member against accidental separation from its driving shaft. The present application is a division of parent application Serial No. 704,467, filed December 23, 1957, now Patent 2,954,994 granted October 4, 1960.

The invention has especial, though not exclusive, application to impact wrenches in which the anvil has an integral shank which drives the socket member with a series of torsional impacts. During the transmission of impacts, the shank is twisted intermittently and therefore is liable to fatigue failure in areas where the strain is excessive, particularly alongside a hole in the shank, which may have been provided for the reception of a retaining pin.

Various arrangements have been proposed and used for detachably locking a wrench socket member to its drive shank. Such prior locking devices usually have one or more undesirable characteristics as follows:

(1) An arrangement of registering bores in both the socket member and shank for the reception of a diametrically extending locking pin with the resulting necessity of providing a supplementary retainer to keep the locking pin from coming out of the socket member.

(2) Location of the locking pin and of the associated radial bore in the driving portion of the shank, where the shank is subjected to great torsional strains, with the resulting liability of breakage or fatigue failure adjacent the bore.

(3) Inaccessibility of the releasing means for the retaining device, with resulting loss of time to the operator or unnecessary complication of structure to give the operator access by remote control.

(4) A socket member recess of limited axial depth for the reception of the locking detent thus requiring a precise axial alignment of the shank and socket member to make the locking device effective, which alignment may fail to occur if the parts are not made to close tolerances or if they become worn in use.

(5) The need for registration of the locking detent with a socket member recess of limited circumferential extent with the result that the operator loses time in orienting or adjusting the socket member into proper angular relation with the driving shank when he assembles the parts.

The general object of the present invention is to overcome the disadvantages of prior devices, as above mentioned. More specifically, an object of the present invention is the provision of a wrench socket member which is simple in construction, reliable and effective in operation; which does not require a hole in the associated shank in any locality where a hole might unduly weaken the shank; which does not require any radial opening in the socket member or special retainer to keep the detent from coming out of the socket member; which permits the socket member to float axially upon the shank without loss of effectiveness of the retainer; and which automatically and securely locks into position when the parts are assembled.

Another object is the provision of a wrench socket member having a set of splines adapted to transmit torsional impacts, and having a shoulder provided at the front end of the splines for engagement with a locking device.

A further object is to adapt the locking device for engagement with any one of a set of circumferentially spaced splines thus making the locking device effective in any selected angular position of the socket member relative to the shank.

A still further object is to make the locking device accessible from the front end of the shank for quickly releasing the locking device for movement to the retracted position when that is desired.

A feature of the invention resides in a set of driven splines within the socket member, each spline having a chamfer or cam shoulder at its opposite ends for engagement with the locking bolt or detent to move the latter to retracted position.

Another object is to enable the locking bolt or detent to be so located that the radial hole in the shank which supports the detent lies forward of the part of the shank which is subjected to torsional strain and thereby avoids the danger of breakage or fatigue failure adjacent the hole.

Other objects and features of the present invention will appear more clearly from the following description taken in connection with the accompanying drawings and appended claims.

In the drawings, which illustrate one embodiment of the invention, and in which FIGS. 1 and 2 are drawn to a smaller scale than the remaining figures:

FIG. 1 is a longitudinal section of a socket member embodying this invention, taken on the line 1—1 of FIG. 2, a fragmentary portion of the socket member being shown in elevation;

FIG. 2 is an elevational view of the rear end of the socket member of FIG. 1;

FIG. 3 is an enlarged fragmentary longitudinal section of the socket member in association with a driving shaft and the elements for locking the socket member in assembled position on the shaft;

FIG. 4 is a longitudinal section similar to FIG. 3 showing the position of the socket member when it is being assembled or disassembled and showing also a screw driver holding the retaining means in non-locking position;

FIG. 5 is a front end view of the shaft and socket member assembly, part of the socket member being broken away;

FIG. 6 is a cross-section on the line 6—6 of FIG. 4 with portions of the shaft broken away, the detent being shown in non-locking position;

FIG. 7 is a fragmentary longitudinal section of the front end of the socket member taken on the line 7—7 of FIG. 5; and FIG. 8 is a fragmentary cross-section of the socket member on the line 8—8 of FIG. 3, showing also in broken lines the detent in its projected or locking position.

Referring to FIG. 3, the invention is illustrated as applied to a rotatable shaft 15 adapted to form the driven element of a power operated impact wrench. The shaft has a cylindrical portion 18, adapted to be supported for rotation in the impact wrench housing (not shown), and has a forwardly extending shank 19 adapted to project within the rear portion of the wrench socket member 20. The front portion of the socket member is provided with an hexagonal recess 21 to receive and drive a nut 17, or bolt. To facilitate insertion of the latter into the socket member, the recess 21 is formed with a chamfered portion 22 shown best in FIGS. 5 and 7. The chamfered portion 22 comprises six frusto-conical surfaces each bounded by two planes at right angles to each other.

In order to provide a detachable driving connection between the shaft 15 and the socket member 20, the shank portion 19 is provided with a series of circumferentially spaced longitudinally extending splines 23 separated by longitudinal grooves 24. The driving splines 23 extend into complementary longitudinal grooves 25 formed in the wrench socket member, the latter grooves being separated by driven splines 26 extending inwardly from the socket member 20 and engaging between the driving splines 23 on the shaft. The splined connection 23, 24, 25, 26 permits relative longitudinal or axial movement between the shaft 15 and socket member 20 but prevents any appreciable relative movement in a rotary direction, whereby the full force of the torsional impacts are transmitted from the shaft to the socket member without being attenuated on account of any lost motion connection.

To facilitate reception of the shank 19 into the socket member 20, the socket splines 26 are provided with a chamfer or inclined shoulder 27 on their rear ends, the chamfered faces forming discrete segments of a cone projecting forwardly toward an apex co-axial with the center of the shank and socket member. A similar chamfer or inclined shoulder 28 is formed near the front end of the driving splines 23 on the shank, but is separated from the front extremity of the shank by a pilot portion 29. The pilot portion consists of cylindrical surfaces broken up by the bottom portions of the longitudinal grooves 24, as best seen in FIG. 4.

The longitudinal grooves 24 in the shank are cut by a conventional hobbing machine with the result that the bottom of each longitudinal groove 24 extends in a straight line from the front extremity of the shank 19 up to the point 31 (FIGS. 3 and 4) beyond which the groove curves in increasing slope until it vanishes or merges with the cylindrical portion 18 at the point 32. Preferably the bottom of the groove 24, between the points 31 and 32, is in the shape of a circular arc tangent at the point 31 with the straight part of the bottom of the groove. As usual, in the case of spline grooves formed by conventional hobbing methods, the top of each groove 25 gradually diminishes in width as as the groove diminishes in radial depth between the points 31 and 32. When the parts are new, the splined shank may be inserted into the socket member only to the extent indicated in full lines in FIG. 3 where the point of tangency 31 lies adjacent the vertex of the angle formed by the longitudinal inner edge of the driven spline 26 and the chamber 27. As the splined connection becomes worn in use, however, the main part of the driven spline 26 gradually penetrates into the restricted part of the groove 24 between the points 31 and 32. In using this invention, the operator presses the tool, including the driving shank 19, against the socket member 20, and the axial thrust is sustained by the rear ends 27 of the driven splines against the wash-out portion of the hobbed grooves 24. The invention makes it possible for the thrust to be sustained in this manner because it does not put any axial thrust upon a retaining pin. The final position of the worn out socket member relative to the shank 19 is illustrated in dot-dash lines in FIG. 3.

In order to prevent the socket member 20 from becoming accidentally detached from the driving shaft 15, a locking bolt or detent 34 is mounted for sliding movement in a radial bore 35 in the shank 19. As shown in FIGS. 3 and 4, the detent has a convex upper tip 36 preferably shaped as a spherical zone, a cylindrical portion 37 lying below the convex tip and fitting the radial bore 35, and a base portion 38 separated from the cylindrical portion by a shoulder 39. As shown in FIG. 6, the center of the radial bore 35 lies midway between two adjacent driving splines 23 with the result that only a small part of both splines is cut away. As shown in FIGS. 3 and 4, the radial bore 35 is situated near the front end of the shank 19, a part of the bore opening into the chamfered portion 28 of the driving splines 23. This location is forward of the area where the torque is transmitted through the splines, and therefore obviates or lessens the danger of breakage or fatigue failure of the shank 19 because the latter is not subjected to any substantial torsional strain in the cross sectional area which includes the radial bore.

When the detent 34 is in its retracted position, shown in FIGS. 4 and 6, the convex tip 36 lies below the longitudinal groove 24 of the shank and out of the path of movement of the driven splines 26, and therefore does not interfere with axial movement of the socket member 20 in either direction relative to the shaft 15. When the detent 34 is extended, however, as shown in FIGS. 3, 5 and 8, the convex tip 36 lies in the direct path of movement of the driven splines 26. In its extended position the convex tip 36 is adapted to engage an inclined shoulder 40 formed on the front end of the associated driven spline 26. Preferably, there is a similar inclined shoulder 40 formed on each of the driven splines so that the detent may be effective in any selected angular relation between the driving shaft 15 and the socket member 20. The shoulders 40 are arranged to form discrete segments of a cone tapering rearward toward an apex in line with the center of the socket member. Each shoulder extends from the crest of the driven spline 26 outward and rearward to the root of the driven spline where the inclined shoulder 40 meets a rounded corner 41 connected to a central annular recess 42 formed in the socket member 20 near the mid-portion thereof. Preferably, the recess 42 is of cylindrical shape and has a diameter slightly exceeding the depth of the longitudinal grooves 25.

As shown in FIG. 8, the crests of the driven splines 26 form discrete segments of a cylindrical surface coaxial with the central annular recess 42 and the frusto-conical shoulder surfaces 40. The grooves 25 between splines 26 have concave side walls which are more widely spaced at the open end of the groove where they intersect the cylindrical surface aforesaid, than at the bottom of the groove. The grooves are uniformly spaced and are of uniform cross section from the inner front end of the rear shoulder 27 to the inner rear end of the front shoulder 40. In the operating condition of the parts, as shown in FIG. 3, the convex tip 36 on the detent 34 engages the associated inclined shoulder 40 when the parts are new but lies forward of the shoulder 40 in operating condition when the parts are worn. In the worn condition of the parts the socket member 20 has moved rearward relative to the detent 34 and shank 19 to the position shown in dot-dash lines in FIG. 3. The rearward movement of the inclined shoulder 40 relative to the detent 34, or conversely the forward movement of the detent relative to the inclined shoulder, is made possible by the recess 42 which permits unobstructed forward movement of the detent tip 36 and of the front end of the shank 19 until movement of the shank is arrested by engagement with the rear ends of the splines 26 as previously described. If desired, however, the detent may be positioned to lie forward of the inclined shoulder even when the parts are new, the relative axial position not being critical. Upon application of a force tending to remove the socket member 20 from the shank 19, the inclined shoulder 40 engages the detent with a camming action and thus tends to move it downward or radially inward. As long as the detent is locked against such downward movement, however, the socket member is positively locked against separation from the shank.

When the socket member 20 is pulled away from the shank 19 with sufficient force to overcome friction, the inclined shoulder 40 acts as a cam to force the detent downward to retracted position, and thus permit removal of the socket, provided, however, that the inner end of the detent is unopposed in such motion.

The means for selectively permitting movement of the detent 34 to retracted position, or for positively locking it in extended position, will now be described. For the reception of such selective means, the shaft 15 is provided with an axial bore 43, an intermediate counterbore 44 in front of said bore, and a larger counterbore 45 extending to the front extremity of the driving shaft 15. The intermediate counterbore supports for relative axial (but not relative rotative) movement, the cylindrical or stem portion 46 of a plunger 47. The plunger has a head portion 48 generally of cylindrical shape and slidably fitting the large counterbore 45, the front end of said head terminating in a shoulder 49 normally seated against a snap ring 51. The snap ring is mounted in an annular groove 52 formed in the large counterbore 45. The plunger shoulder 49 is yieldingly held in its extreme forward position, in engagement with the snap ring 51, by means of a compression spring 54 interposed between the driving shaft 15 and the plunger 47. When the plunger is in its normal forward position, as shown in FIG. 3, the cylindrical stem 46 thereof fits within a cylindrical recess 56 (FIG. 4) at the inner end of the detent 34, and thus positively locks the detent in its extended position, while the detent in turn acts as a positive lock upon the inclined shoulder 40. The detent shoulder 39 is adapted to abut against the large counterbore 45 to limit outward movement of the detent toward extended position when such movement is not otherwise limited by engagement with the socket member 20. Below the shoulder 39, the detent has a tapered portion 58 adapted to be received within a correspondingly tapered recess 59 provided in the plunger 47, when the latter is forcibly displaced against the pressure of spring 54, to the unlocking position shown in FIGS. 4 and 6.

In the use of the present invention, when the operator desires to attach the socket member 20 to the shaft 15, he holds these two elements approximately in axial alignment and moves them together until the pilot portion 29 abuts against the chamfer 27 and starts to enter the opening which is surrounded by the driven splines 26. The socket member and shaft are then aligned axially with the beveled front edges 28 of the driving splines 23 seated against the chamfered shoulder 27. The operator then orients the socket member 20 and shaft 15 to bring the driving splines 23 into alignment with the grooves 25 between the driven splines 26 and vice versa. The splines move a slight distance into interengaging relation when axial motion is arrested by engagement of the convex tip 36 of the locking bolt or detent 34 with the chamfered shoulder 27. At this time, the detent is positively locked against inward or retracting movement by the plunger 47. Outward movement of the detent, however, is limited by engagement of shoulder 39 with the large counterbore 45 so that the detent does not engage any part of the socket member outwardly of the chamfered shoulder 27.

The operator then releases the plunger by inserting his finger or a suitable implement such as a screwdriver 60 (FIG. 4), through the front end of the socket member 20 to engage the front face of the plunger 47 and move it away from the snap ring 51 with the plunger recess 59 positioned to receive the tapered portion 58 at the inner end of the detent. Thereupon the chamfered shoulder 27 reacts upon the convex tip 36 to displace the detent 34 to its inward or retracted position by a camming action, and the splined shank 19 may be inserted freely into the splined portion of the socket member 20. As soon as the detent 34 passes beyond the chamfered shoulder 27 and engages the longitudinal crest of the associated driven spline 26, the screwdriver 60 may be released, as the engagement with the driven spline prevents the detent from being extended. After the detent passes the main part of the driven spline 26 and starts to engage the inclined shoulder 40, the detent is released for movement to the extended or locking position. Assuming that the manual force has been removed from the plunger 47, the detent is moved outward by the camming action of the rear part of tapered recess 59 on the tapered portion 58 of the detent, as the spring 54 moves the plunger 47 forward into or toward engagement with the snap ring 51. The parts then occupy the position shown in FIG. 2 with the stem 46 of the plunger locking the detent 34 against inward or retracting movement, and the detent acting on the inclined shoulder 40 to lock the socket member 20 against separation from the driving shank or anvil. To remove the socket member, the operator simply unseats the plunger as illustrated in FIG. 4 and separates the socket member from the shank with a pulling or hammer action. Axial movement of the socket member in a releasing direction causes the inclined shoulder 40 to cam the detent 34 toward release position, as described in connection with the chamfered shoulder 27.

If desired, the periphery of the socket member 20 may be provided with depressions or recesses 61 for the reception of a bright plastic material (not shown) to enable the operator to count the number of turns, or half turns, of the socket member under impacting conditions and thus control the tightness of the nut or bolt (not shown) driven by the socket member.

In the process of manufacture of the socket member 20, the cylindrical, frusto-conical and toroidal surfaces are formed by a machining operation, and then the longitudinal grooves 25 are cut by a broaching operation to form the driven splines 26. The method of making the socket is claimed in applicant's divisional application Serial No. 108,945, filed May 9, 1961.

What is claimed is:

1. A wrench socket member having an opening extending axially therethrough, the front portion of the opening having a polygonal recess to receive a driven nut or bolt, the rear portion of the opening being surrounded by a series of inwardly projecting longitudinal splines separated by longitudinal grooves, said splines being adapted to be driven by a rotary shaft, the socket member having a central annular recess in front of the splines, each spline having a longitudinal crest and having a rear shoulder diverging outward from said crest to the rear extremity of the socket member and having an inclined front shoulder diverging forward from the crest toward the central annular recess, the crests forming segments of a cylindrical surface and the shoulders forming respectively segments of a front and a rear frusto-conical surface, said cylindrical and frusto-conical surfaces being broken up by the longitudinal grooves, said grooves extending from the rear extremity of the socket member to the central annular recess, the space between the inclined front shoulders and the central annular recess being unobstructed to permit the reception of a locking device between the central annular recess and the inclined front shoulder of any selected one of the splines, whereby the selected front shoulder may provide a thrust sustaining means to limit forward movement of the socket member relative to the shaft.

2. A socket member as defined in claim 1, in which the central annular recess has the shape of a cylinder whose diameter extends slightly beyond the depth of the longitudinal grooves.

3. A socket member as defined in claim 1, in which the grooves have a depth which extends beyond the maximum diameter of the frusto-conical surface at the rear end of the splines.

4. A wrench socket member according to claim 1, in which the rear ends of all of said splines are constructed and arranged to provide a thrust sustaining means adapted to limit rearward movement of the socket member relative to the shaft.

5. In a power operated impact wrench, a rotatable socket member having an opening at its rear end arranged for the reception of a driving shaft, said opening being surrounded by longitudinal splines and grooves adapted to interfit with complementary grooves and splines respectively on the shaft, each socket member spline having at its front end a shoulder inclined outwardly and forwardly and having a longitudinal crest extending rearward from the shoulder and having a chamfered edge diverging from the longitudinal crest toward the rear extremity of the socket member, the socket member having a central recess in front of the splines, said central recess having a diameter which extends beyond the depth of the grooves, the socket member also having an opening positioned forwardly of the central recess to provide access to said central recess, each of said shoulders and each of said chamfered edges being adapted selectively for camming engagement with a locking device carried by the shaft, the space between the inclined front shoulders and the central recess being unobstructed to receive said locking device in said space and permit the locking device to move forward away from the front shoulder as the rear ends of the splines become worn.

6. In a power operated impact wrench, a socket member as defined in claim 5, in which the central recess comprises a cylindrical surface and the shoulders form portions of a frusto-conical surface, with each of said shoulders extending in substantially a straight line, the front end of each shoulder being connected to the cylindrical surface of the recess by a rounded corner.

7. In a power operated impact wrench, a socket member as defined in claim 5, in which each longitudinal groove has a depth which extends outward beyond the chamfered edges at the rear end of the splines.

8. A socket member adapted for attachment to the driven shaft of an impact wrench, said socket member being constructed in one piece and having an opening extending axially therethrough, the front portion of the opening having a polygonal recess to receive a driven nut or bolt, the rear portion of the opening being surrounded by a series of inwardly projecting longitudinal splines separated by longitudinal grooves, said splines being adapted to be driven by said shaft, each spline having a longitudinal crest and having a rear shoulder inclined outwardly and forwardly, the crests forming segments of a cylindrical surface and the shoulders forming respectively segments of a rear and a front frusto-conical surface, said cylindrical and frusto-conical surfaces being broken up by the longitudinal grooves, said grooves extending from the rear extremity to the front shoulders, the grooves being uniformly spaced and of uniform cross section from the front end of the rear shoulder to the rear end of the front shoulder, each groove having concave side walls which are more widely spaced at the open end of the groove where they intersect the cylindrical surface than at the bottom of the groove, said side walls being arranged to receive torsional thrusts transmitted through the shaft.

9. A socket member according to claim 8, which has a transverse wall near its middle portion, the front face of the transverse wall defining the rear end of the polygonal recess, the rear face of the transverse wall being axially spaced forwardly from the front shoulders.

10. In a power operated impact wrench, a rotatable socket member having an opening at its rear end arranged for the reception of a driving shaft, said opening being surrounded by longitudinal splines and grooves adapted to interfit with complementary grooves and splines respectively on the shaft, each socket member spline having at its front end a shoulder inclined outwardly and forwardly and having a longitudinal crest extending rearward from the shoulder, said longitudinal crests terminating at their rear ends in a common plane which lies forward of the plane of the rear extremity of the socket member, the socket member having a central recess in front of the splines, the socket member also having an opening positioned forwardly of the central recess to provide access to said central recess, each of said shoulders and each of the rear ends of the splines on the socket member being adapted selectively for camming engagement with a locking device carried by the shaft, the space between the inclined front shoulders and the central recess being unobstructed to receive said locking device in said space and permit the locking device to move forward away from the front shoulder as the rear ends of the splines become worn.

References Cited in the file of this patent

UNITED STATES PATENTS

| | | |
|---|---|---|
| 2,009,371 | Junge | July 23, 1935 |
| 2,108,866 | Mandl | Feb. 22, 1938 |
| 2,202,240 | Trotter | May 28, 1940 |
| 2,587,838 | Green | Mar. 4, 1952 |
| 2,623,418 | Vaughan | Dec. 30, 1952 |
| 2,634,642 | Viets | Apr. 14, 1953 |
| 2,774,259 | Caulkins | Dec. 18, 1956 |
| 2,927,510 | Wildhaber | Mar. 8, 1960 |
| 3,011,794 | Vaughn | Dec. 5, 1961 |